US007868850B2

(12) United States Patent
Jin et al.

(10) Patent No.: US 7,868,850 B2
(45) Date of Patent: Jan. 11, 2011

(54) FIELD EMITTER ARRAY WITH SPLIT GATES AND METHOD FOR OPERATING THE SAME

(75) Inventors: Sungho Jin, San Diego, CA (US); Dong-Wook Kim, San Diego, CA (US); In Kyung Yoo, Kyongki-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1150 days.

(21) Appl. No.: 11/223,130

(22) Filed: Sep. 12, 2005

(65) Prior Publication Data

US 2007/0235772 A1 Oct. 11, 2007

Related U.S. Application Data

(60) Provisional application No. 60/616,383, filed on Oct. 6, 2004.

(51) Int. Cl.
*G09G 3/28* (2006.01)
*G09G 5/00* (2006.01)
*G06F 3/02* (2006.01)

(52) U.S. Cl. .................................... 345/60; 315/169.3

(58) Field of Classification Search .................. 345/60; 315/169.3, 169.4; 313/495–497; 438/20, 438/585, 619, 693; 257/236, E21.244
See application file for complete search history.

(56) References Cited

U.S. PATENT DOCUMENTS

| | | | | |
|---|---|---|---|---|
| 5,079,112 | A | | 1/1992 | Berger et al. |
| 5,194,780 | A | | 3/1993 | Meyer |
| 5,229,331 | A | * | 7/1993 | Doan et al. .................. 438/20 |
| 5,532,496 | A | | 7/1996 | Gaston |
| 5,701,014 | A | | 12/1997 | Berger et al. |
| 6,297,592 | B1 | | 10/2001 | Goren et al. |
| 6,377,002 | B1 | * | 4/2002 | Ge et al. ..................... 315/366 |
| 6,498,349 | B1 | | 12/2002 | Thomas et al. |
| 6,553,096 | B1 | * | 4/2003 | Zhou et al. .................. 378/122 |
| 6,555,402 | B2 | | 4/2003 | Wells et al. |
| 2004/0245224 | A1 | * | 12/2004 | Fink et al. ............. 219/121.13 |

OTHER PUBLICATIONS

W. Zhu et al., Large current density from carbon nanotube field emitters, Aug. 9, 1999, Applied Physics Letters, vol. 75., No. 6, pp. 873-875.

(Continued)

*Primary Examiner*—Srilakshmi K Kumar
(74) *Attorney, Agent, or Firm*—Harness, Dickey & Pierce, P.L.C.

(57) ABSTRACT

Field emitter arrays with split gates and methods for operating the same. A field emitter array may include one or more pairs of split gates, each connected to a corresponding voltage source, the split gates forming at least one gate hole for at least one emitter tip. Voltages, for example, AC voltages $V_1$ and $V_2$ may be applied to the split gates to perform one- or two-dimensional scanning or tilting depending on a ratio of $V_1$ and $V_2$.

9 Claims, 11 Drawing Sheets

OTHER PUBLICATIONS

Deuk-Seok Chung et al., Carbon nanotube electron emitters with a gated structure using backside exposure processes, May 27, 2002, Applied Physics Letters, vol. 80, No. 21, pp. 4045-4047.

C. Bower et al., On-chip vacuum microtriode using carbon nanotube field emitters, May 20, 2002, Applied physics Letters, vol. 80, No. 20, pp. 3820-3822.

James B. Pawley, LVSEM for High Resolution Topographic and Density Contrast Imaging, 1992, Advances in Electronics and Electron Physics, vol. 83, pp. 203-274.

H. Sugie et al., Carbon nanotubes as electron source in an x-ray tube, Apr. 23, 2001, Applied Physics Letters, vol. 78, No. 17, pp. 2578-2580.

Jon William Tiogo, Special Industry Report, Avoiding a Data Crunch, The technology of computer hard drives is fast approaching a physical barrier imposed by the superparamagnetic effect overcoming it will require tricky innovations, May 2000, Scientific American, pp. 59-74.

* cited by examiner

FIELD EMITTER ARRAY WITH SPLIT GATES AND METHOD FOR OPERATING THE SAME

PRIORITY STATEMENT

This application claims the benefit of U.S. Provisional Patent Application No. 60/616,383, filed on Oct. 6, 2004, in the U.S. Patent and Trademark Office, the disclosure of which is incorporated herein in its entirety by reference.

FIELD OF THE INVENTION

Example embodiments of the present invention relate to field emitter arrays with split gates and methods for operating the same.

DESCRIPTION OF THE RELATED ART

Field emitters and vacuum microelectronics have many possible applications including field emission displays, microwave power amplifiers, nanometric-scale electron beam lithography, scanning electron microscopy, compact x-ray tubes, and high density data storage.

Field emission offers several unique and unsurpassed characteristics. For instance, the limiting carrier velocity, e.g., electron velocity, in vacuum is the speed of light, which is much faster than in a solid, such as silicon (Si) or gallium arsenide (GaAs). Field emission generates electrons with smaller energy spread, which makes it possible to produce more focused electron beams. A field emitter array (FEA) may be integrated by conventional micro- and nano-fabrication processes, which results in compact and low-power devices.

However, field emitters may have a uniformity problem, which may originate from several possible causes, for example, the nature of the Fowler-Nordheim tunneling mechanism, contamination-caused degradation, defective structures generated during fabrication, etc.

To overcome this problem, there have been several attempts to fabricate similar field emitter tips and gates during manufacturing. Introducing resistive layers between the field emitters and the emitter lines may improve the uniformity of field emitter arrays. Such field emitters were disclosed by. A lateral resistor mesh may be used to homogenize the emission current and/or prevent a short-circuit by limiting the electrical current to a potentially run-away cathode. While this technique works and may be valuable, additional resistance can substantially raise the required driver voltage and also reduce the maximum achievable emission current.

SUMMARY OF THE INVENTION

Example embodiments of the present invention are directed to a structure of a field emitter array with integrated split gates with the number of gates, which is capable of tilting or scanning electron beams to improve the beam uniformity. For example, the time-integrated uniformity of the resultant electron beam provided by the structure on any given location or selected area in the target substrate or anode may be improved by at least 10% or by at least 30%, for example, as measured by the ratio of the highest cumulative electron dose on a given area of the anode or target surface to be electron beam illuminated, as compared to the lowest cumulative electron dose on the same given area.

Example embodiments of the present invention are directed to a structure, wherein each field emitter has a pair of electrodes for one-dimensional beam scanning.

Example embodiments of the present invention are directed to a structure, wherein each field emitter has two pairs of electrodes for two-dimensional beam scanning.

Example embodiments of the present invention are directed to a method of operating a field emitter array with integrated split gates by applying AC voltages to the split gates.

Example embodiments of the present invention are directed to a method of operating split-gate a field emitter array which utilizes gate voltage applying schemes of gate-to-gate alternating operation, overlapping or non-overlapping gate-to-gate sequential operation, or independently time-modulated application of activating gate voltages on each of the split gates.

Example embodiments of the present invention are directed to a field emitter flat-panel display including a field emitter array with split gates as described above and/or operated by one or more of the methods as described above.

Example embodiments of the present invention are directed to a field emitter projection electron beam lithography tool including a field emitter array with split gates as described above and/or operated by one or more of the methods as described above.

Example embodiments of the present invention are directed to an x-ray source device including a field emitter array with split gates as described above and/or operated by one or more of the methods as described above.

Example embodiments of the present invention are directed to a field emitter array structure with integrated split gates and its operation methods.

Example embodiments of the present invention may produce electron beams with improved spatial uniformity. Detailed structure and examples of applications are given below.

BRIEF DESCRIPTION OF THE DRAWINGS

The present invention will become more apparent by describing in detail example embodiments thereof with reference to the attached drawings.

It is to be understood that these drawings are for the purposes of illustrating the concepts of the invention and are not to scale. For example, the dimensions of some of the elements are exaggerated relative to each other.

DETAILED DESCRIPTION OF EXAMPLE EMBODIMENTS OF THE PRESENT INVENTION

Figure 1:
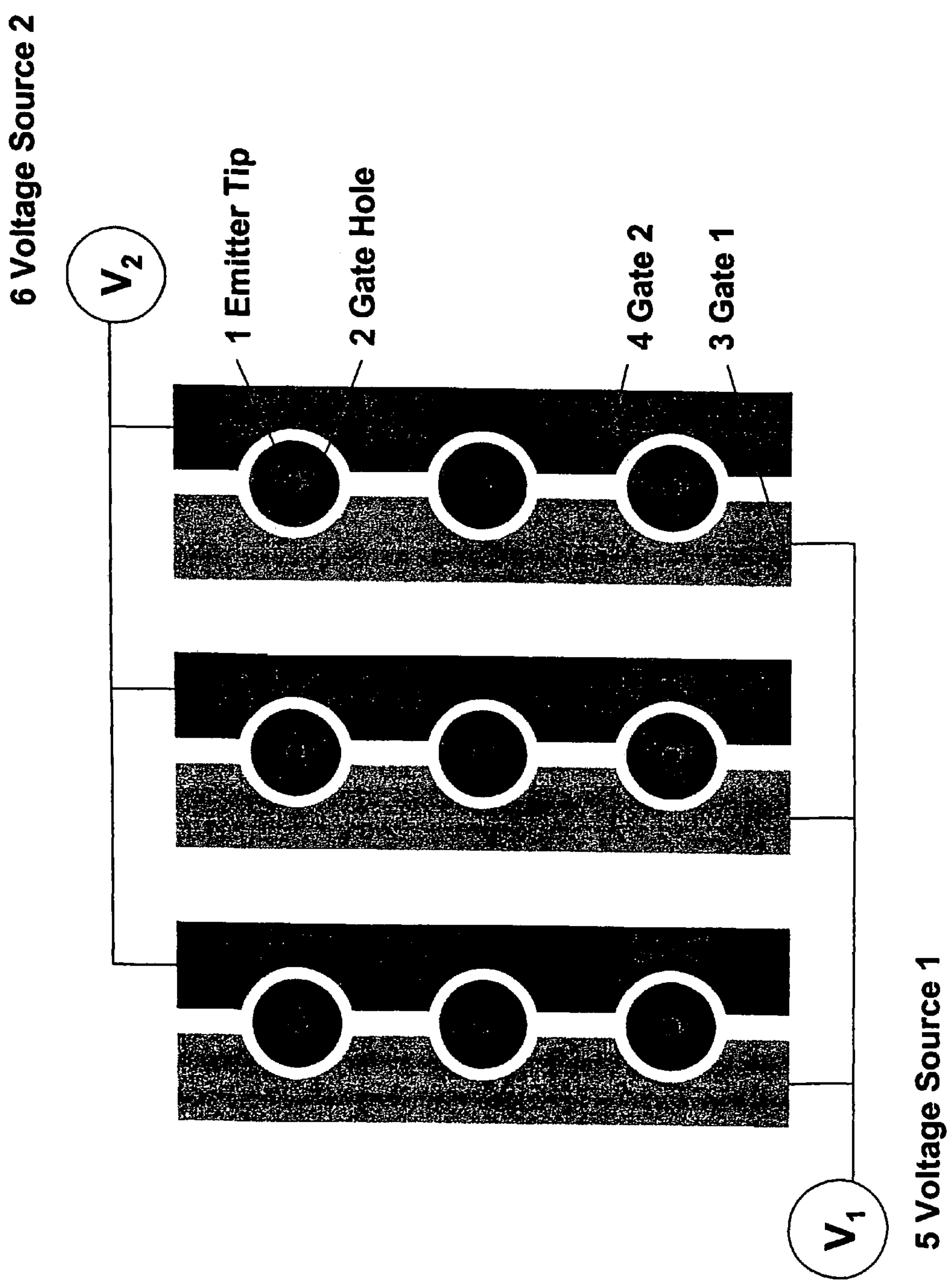
FIG. 1 illustrates a top-view of field emitter array with split gates in accordance with an example embodiment of the present invention.

FIG. 1 illustrates a top-view of field emitter array (FEA) with split gates connected to independent voltage sources, in accordance with an example embodiment of the present invention. Each field emitter may be positioned at the center of a gate hole 2 and have its own accelerating gates, for example first gate 3 and second gate 4. Gate holes 2, which may have a diameter in the range of 0.1-1 μm, may be located with the tip-to-tip spacing in the range of 0.2 to 5 μm, and an insulator material may have a relatively large dielectric breakdown voltage to withstand the strong electric fields for the field emission, for example, larger than $10^7$ V/cm.

Field emitter tips 1, either fabricated Spindt tip cathodes or synthesized nanostructures with high field enhancement factors, for example, carbon nanotubes (CNT), may be used. As described above, FEAs may have poor emission uniformity, caused by the discrete nature of the emitter array, some variations in emitter microstructure, emission characteristics among neighboring emitter cells, the sensitive nature of the Fowler-Nordheim tunneling mechanism to slight changes in geometry and electronic properties of the emitter tips, contamination-caused degradations, defective structures generated during fabrication, etc.

In example embodiments of the present invention, uniformity may be improved by a split-gate structure and/or proper operation methods. In FEAs with split gates according to example embodiments of the present invention, the emission direction of electrons may be spatially altered in the presence of the modulating electric field so that the laterally scanning electron beam has an overall homogenizing effect on any particular spot on the anode or the target.

Figure 2:
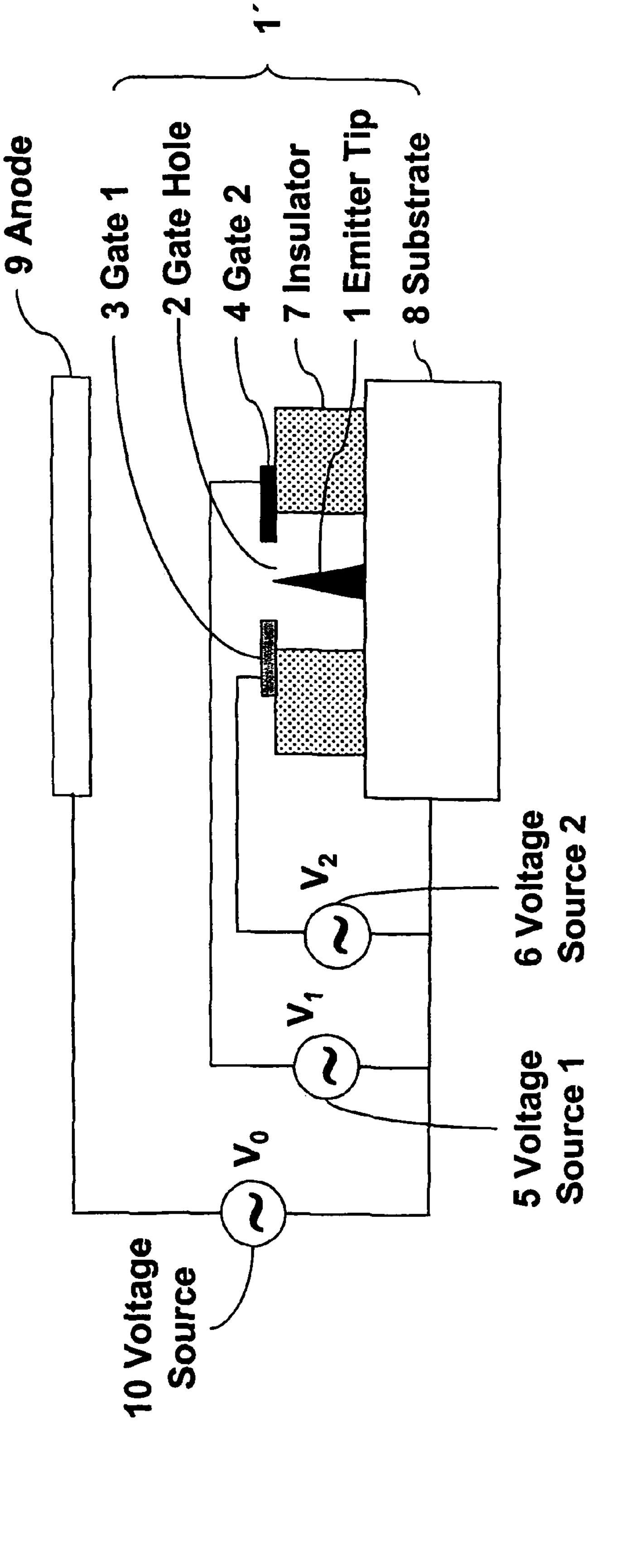
FIG. 2 illustrates a schematic cross-sectional diagram of a field emitter with split gates in accordance with an example embodiment of the present invention.

FIG. 2 illustrates an arrangement of a gated field emitter, an anode, and voltage sources according to an example embodiment of the present invention. Voltages may be applied between the gates 3, 4 and a substrate 8 across an insulator layer 7 by two independent voltage sources 5, 6. The gate hole 2 may be made, e.g., in about a 1 μm thick insulator layer 7. The applied electric fields should be large enough to extract electrons from the field emitter tips 1.

The anode voltage Vo, may accelerate electrons to supply enough electron energy for device operation. For example, anode voltages of 800-2000 V may be applied to an anode plate coated with phosphor to obtain clear contrast and sufficient brightness.

Two independent voltage sources 5, 6 may apply voltages to split gates 3, 4 to extract electrons from the tip 1. When VI=V2, symmetric potential distribution will appear and the electron beam will be directed predominantly parallel to the emitter tip 1. If VI is not equal to $V_2$, asymmetric potential distribution will be obtained and electron emission directions are no longer parallel to the tip 1.

Figure 3:
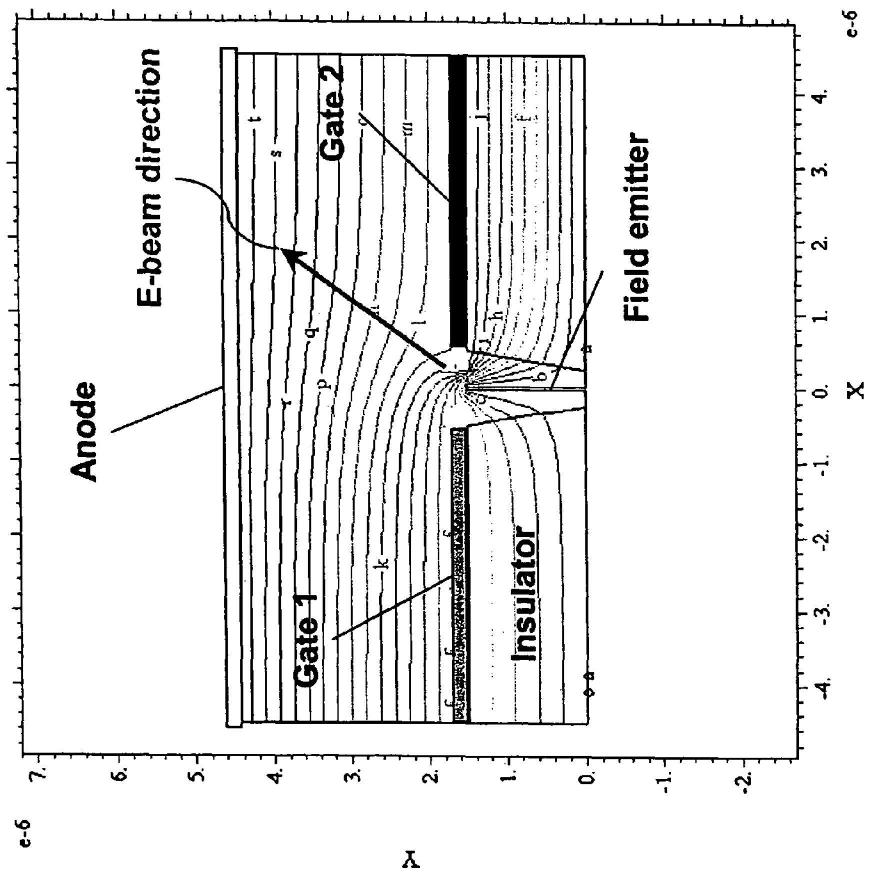
FIG. 3 illustrates an example of calculated asymmetric potential distribution of a field emitter with split gates in accordance with an example embodiment of the present invention.

FIG. 3 illustrates a calculated result of asymmetric potential distribution in the cross-sectional plane of a field emitter with split gates when V2=1/2V1. In this example, the calculation parameters may be: gate hole diameter is 0.5 μm, the insulator thickness is 1.5 μm, the emitter tip diameter is 20 nm, the emitter height is 1.5 μm, and the applied voltage ratio, $V_0$:$V_1$:$V_2$, is 4:1:2. Because V2 is larger than V1, the electric field is stronger between gate 2 and the emitter tip 1 than between the gate 1 and the emitter tip 1 and the electron emission direction should be inclined toward the gate 2, as illustrated in FIG. 3. When VI>V2, the electron direction may be inclined toward gate 1. If VI=V2, emitted electrons are predominantly directed normal to the substrate plane. The direction of electron beams may be altered by varying the voltage ratio $V_0$:$V_1$:$V_2$.

Figure 4:
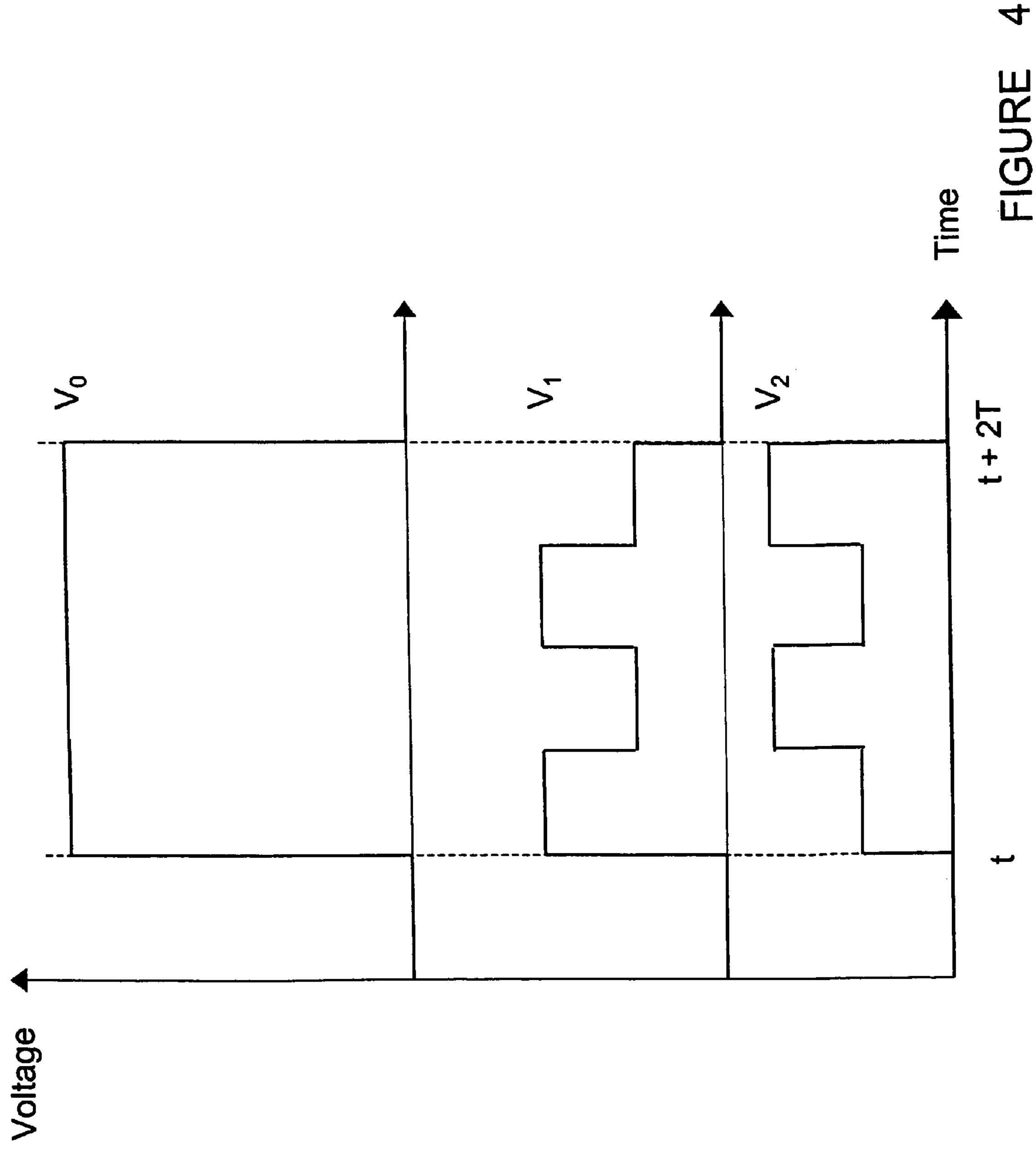
FIGS. 4 and 5 illustrate voltage vs. time curves for anode voltage (Vo), and gate voltages (Vi and VA) in accordance with example embodiments of the present invention.

FIG. 4 illustrates voltage vs. time curves for an anode voltage ($V_0$) and gate voltages ($V_1$ and $V_2$) according to an example embodiment of the present invention. While $V_0$ may be fixed during operation of the FEA device, periodic AC voltages may be applied to $V_1$ and $V_2$. $V_1$ and $V_2$ may include a DC voltage and small periodic AC modulation voltages with, for example, a square waveform. In this example, the electron emission may occur in three discrete directions, depending on the relative magnitude of $V_1$ and $V_2$: the direction will be normal to the substrate in the case of $V_1=V_2$, and can be inclined to gate 1 (or gate 2) when $V_1>V_2$ (or $V_2>V_1$). The electron beam may move back and forth perpendicular to the gate electrode with a periodicity of T. Further, the inclined angle may be adjusted by varying the relative the magnitudes of the three voltages and/or magnitudes of DC and AC voltages for $V_1$ and $V_2$.

Figure 5:
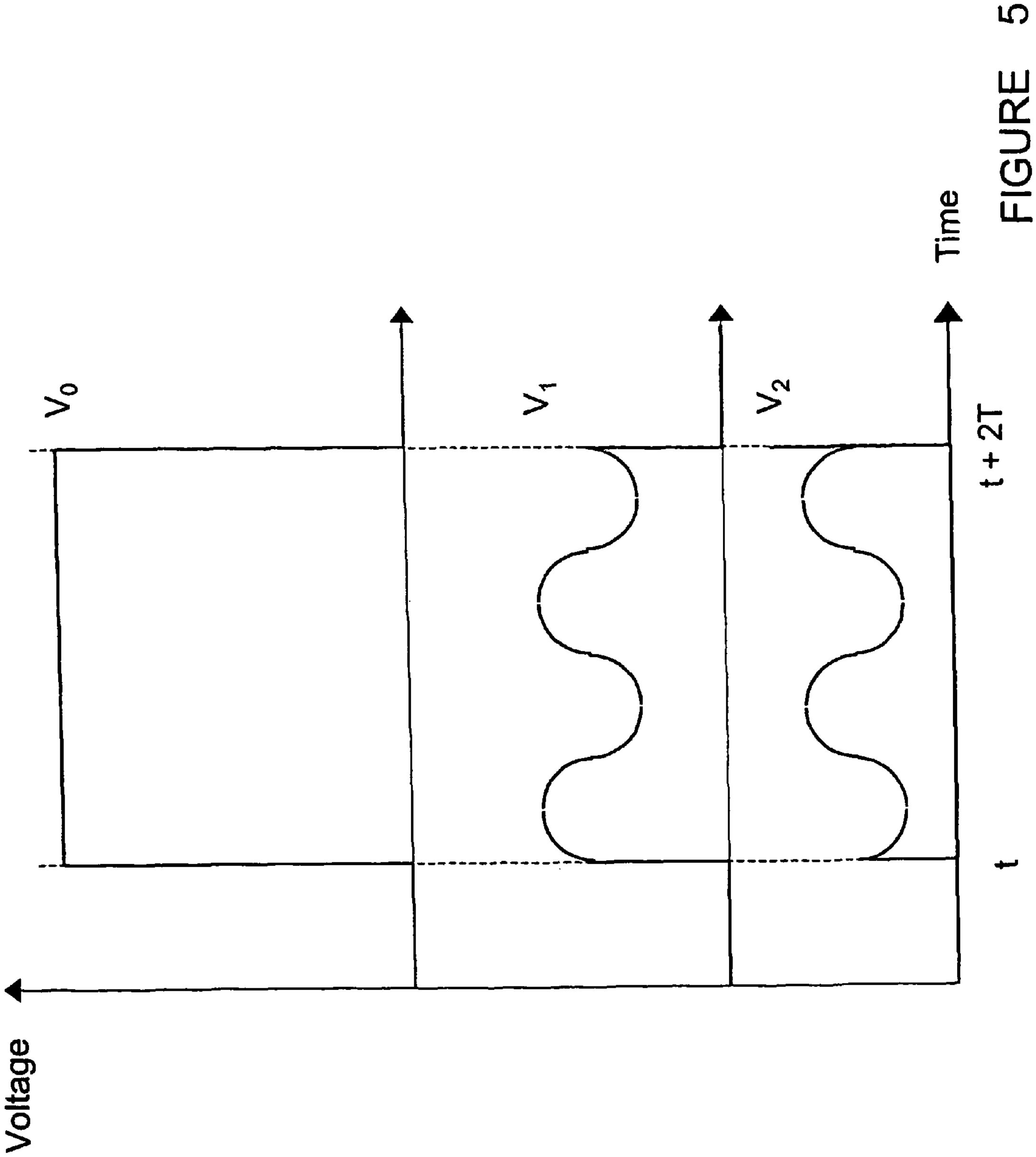

FIG. 5 illustrates another voltage vs. time curves for an anode voltage ($V_0$) and gate voltages ($V_1$ and $V_2$) according to another example embodiment of the present invention. Gate voltages $V_1$ and $V_2$, may have sinusoidal waveforms with a constant DC offset voltage. Compared with the square waveform of FIG. 4, sinusoidal waveforms of the AC modulation voltage may alter the electron direction in a continuous manner and the electron beam can scan the anode. The scanning direction may be perpendicular to the gate electrode and the scanning period is T.

Figure 6:
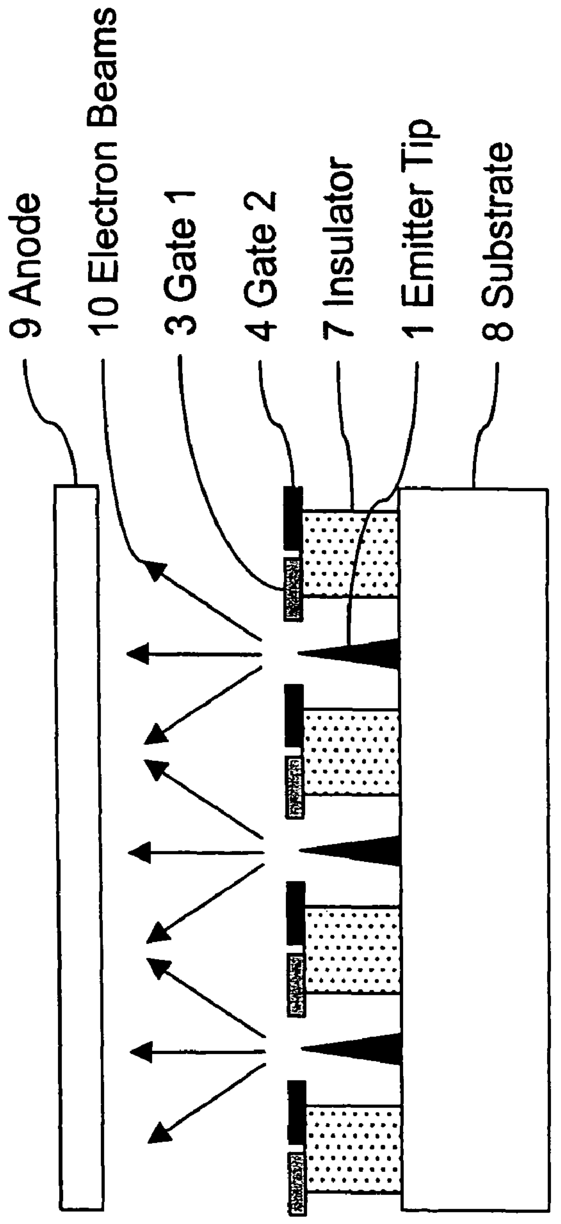
FIG. 6 illustrates a field emitter array with split gates and sweeping electron beams during operation in accordance with an example embodiment of the present invention.

FIG. 6 illustrates a cross-sectional diagram of field emitter array with split gates and scanning electron beams during operation according to another example embodiment of the present invention. Gate electrodes 3, 4 may extract electrons from emitter tips 1. The electron beam may be directed predominantly normal to the substrate plane, if $V_1=V_2$. If an asymmetric potential distribution is formed in the region between the gates 3, 4 and the anode 9, the direction of electron beams 10 may be inclined either to gate 1 or gate 2. When $V_1$, and $V_2$ have a periodic AC voltage component, the electron beam can scan the anode 9, as illustrated in FIG. 6. The scanning distance of the e-beam is determined by the three applied voltages ($V_o$, $V_1$, and $V_2$) and the configuration of the field emitter, for example, the gate hole diameter, the distance between neighboring emitter tips, the ratio of the tip 1 heights and the insulator 7 thickness, etc.

Figure 7:
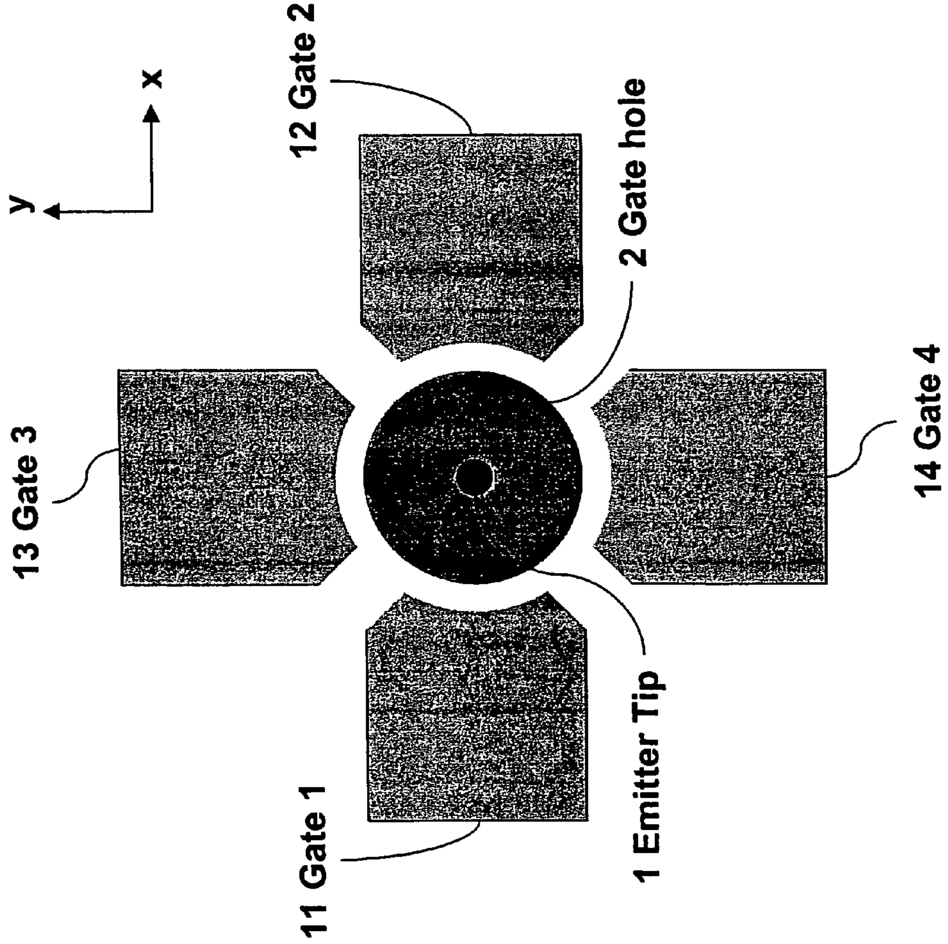
FIG. 7 illustrates the structure of field emitter array with two pairs of split gates, capable of two-dimensional beam scanning in accordance with an example embodiment of the present invention.

FIG. 7 illustrates a field emitter array with two pairs of split gates, capable of two-dimensional beam scanning according to an example embodiment of the present invention. Asymmetric potential distribution may tilt the electron emission direction, but one pair of split gates can generate only line scanning electron beams, rather than a two-dimensional scanning beam. To achieve two-dimensional scanning and aerial scanning, two pairs of gate electrodes may be used. Multiple gates to achieve two-dimensional beam scanning, is shown in FIG. 7.

The first pair of gates 1 and 2 may tilt the electrons along the x-axis, and the second pair of gates 3 and 4 tilt the electrons along the y-axis. Uniform beam scanning capability using this type of 'quadruple' gate structure can be further enhanced by 'octuple' structure or even more gated structures.

Figure 8:
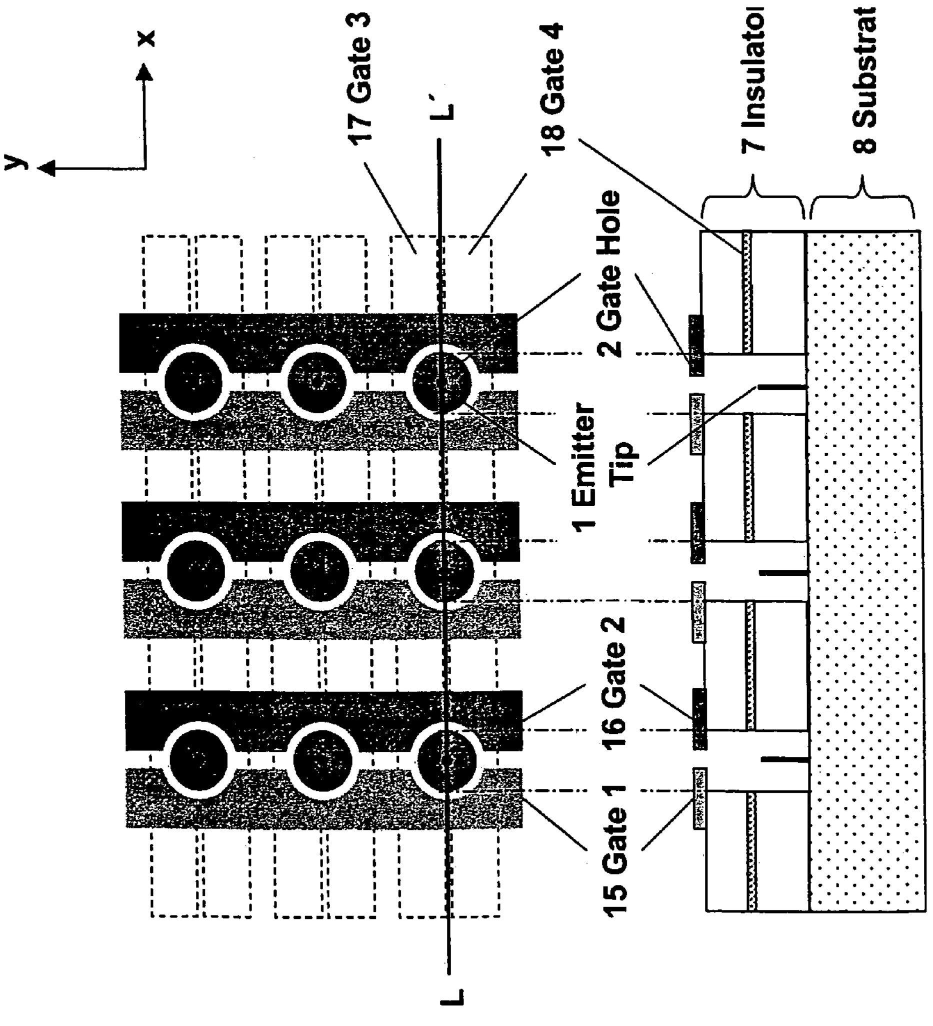
FIG. 8 illustrates the structure of another field emitter array with two pairs of split gates, capable of two-dimensional beam scanning in accordance with an example embodiment of the present invention.

FIG. 8 illustrates a field emitter array with two pairs of split gates, capable of two-dimensional beam scanning according to an example embodiment of the present invention. More gates will generate more uniform electron beams. However, this may result in complicated electrode wiring issues and especially for FEAs with numerous emitter tips. FIG. 8 illustrates an example structure enabling two-dimensional beam scanning. As shown in FIG. 8, each pair of electrodes is perpendicular to the other pair, the first pair of gates 1 and 2 are along the x-axis, enabling y-direction e-beam scanning, and the second pair of gates 3 and 4 are along the x-axis, enabling x-direction e-beam scanning.

A gated field emitter array, for example, a triode structure is basically a discrete source of electrons from each of the emitters. The split-gate structure according to example embodiments of the present invention makes the overall emitted electron beams from these discrete sources spatially more uniform on a given anode (or targeted substrate surface) when integrated over a certain exposure time. Method of operation according to example embodiments of the present invention may utilize various modes of gate voltage applying schemes, for example, a gate-to-gate alternating operation, overlapping or non-overlapping gate-to-gate sequential operation, or independently time-modulated application of activating gate voltages on each of the split gates. The time-integrated uniformity of the resultant electron beam provided by example embodiments of the present invention on any given location or selected area on the target substrate or anode may be improved by at least 10% or by at least 30%, for example, as measured by the ratio of the highest cumulative electron dose on a given area of the anode or target surface to be electron beam illuminated, as compared to the lowest cumulative electron dose on the same given area.

Devices and applications involving example embodiments of the present invention, including field emitter arrays with split gates are described below.

Figure 9:
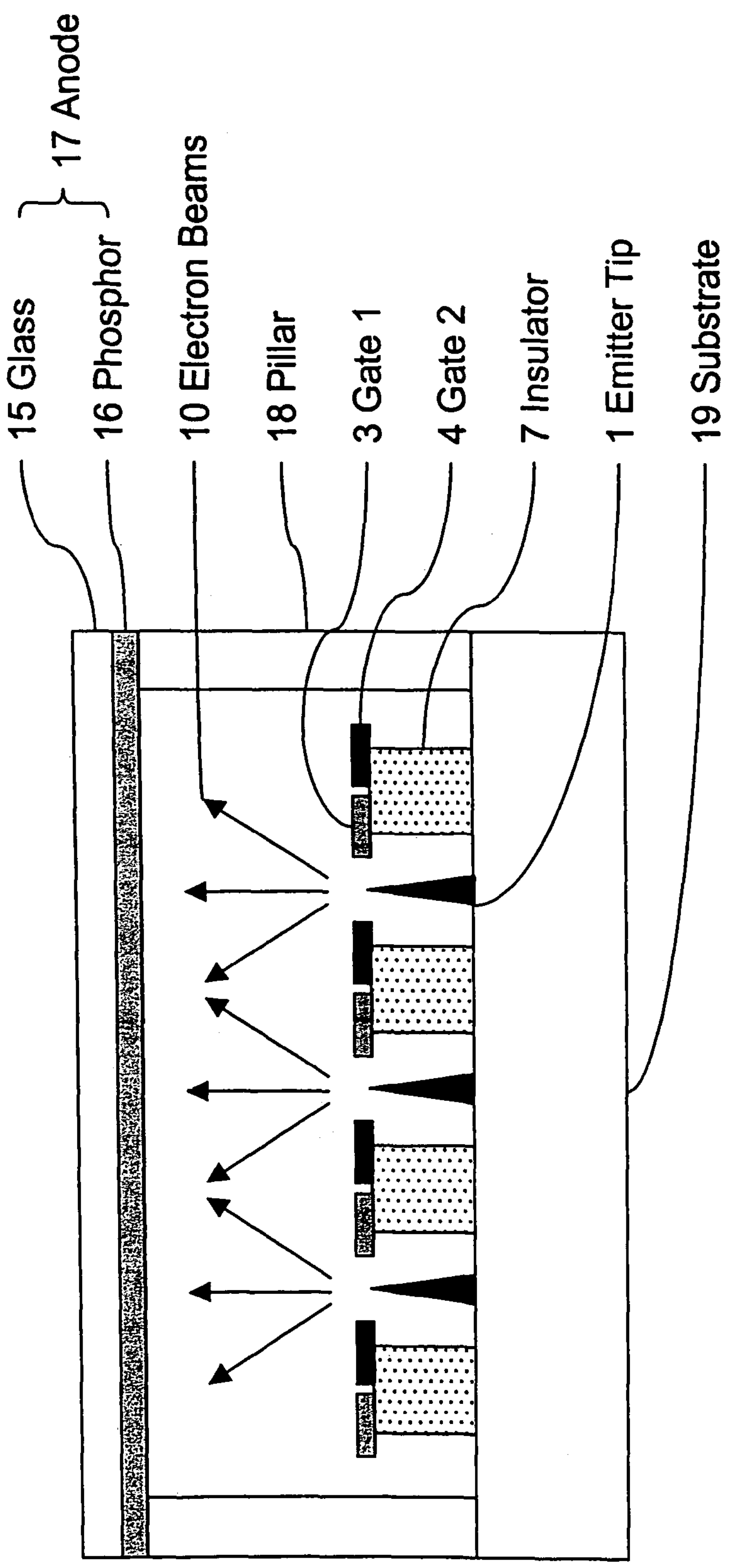
FIG. 9 illustrates an example field emission display including a split gate structural assembly in accordance with an example embodiment of the present invention.

Field emitter array with split gates according to example embodiments of the present invention may be utilized to make flat-panel, field emission displays, for example, as illustrated in FIG. 9. Here, the term "flat panel display" is arbitrarily defined as meaning "thin display" with a thickness of e.g., less than approximately 10 cm. Field emission displays may be constructed with a triode design (e.g., a cathode-gate-anode configuration). The use of split gates may be used to make the field emission more efficient and/or uniform.

For display applications, the emitter material (the cold cathode) in each pixel of the display may include multiple emitters for the purpose, among others, of averaging out the emission characteristics and improving uniformity in display quality. Because of the nanoscopic nature of the nanowires, for example, carbon nanotubes, the emitter may provide many emitting points, but because of desired field concentrations, the density of nanotubes may be less than $100/(\mu m)^2$.

Because efficient electron emission at low applied voltage may be achieved by the presence of an accelerating gate electrode in close proximity (for example, about 1 μ), it may be useful to have multiple gate apertures over a given emitter area to more efficiently utilize the capability of multiple emitters. It may also be desirable to have a finer-scale, micron-sized structure with as many gate apertures as possible for improving or maximzing emission efficiency.

The example field emission display of FIG. 9 may includes a substrate 19, which may also serve as a conductive cathode, a plurality of spaced-apart and aligned emitter tips 1, attached on the conductive substrate 19, and an anode 17 disposed in spaced relation from the emitters within a vacuum seal. The transparent anode conductor formed on a transparent insulating substrate 15 (for example, glass) may be provided with a phosphor layer 16 and mounted on support pillars 18. Uniform electron beams 10 may be generated from the tips 1 with the aid of the split gates 3, 4, which are spaced from the tips 1 by a thin insulating layer 7.

The space between the anode and the emitter may be sealed and evacuated, and voltage may be applied by a power supply (not shown). The field-emitted electrons 10 may be accelerated by the gates 3, 4, and move toward the conductive layer (for example, a transparent conductor, such as indium-tin-oxide) coated on glass 15. Phosphor layer 16 may be disposed between the electron emitters and the anode. As the accelerated electrons hit the phosphor, a display image is generated. The gated field emitter array is basically discrete source of electrons from each of the emitters.

Split-gate structures and/or methods of operation in accordance with example embodiments of the present invention, for example, alternating, sequential, or time-modulated application of activating gate voltages may improves the time-integrated uniformity of the resultant electron beam on any location or local area on a display screen by at least 10% or by at least 30%, for example, as measured by the ratio of the highest electron intensity versus the lowest electron intensity within a given area, for example, within a pixel area of 100×100 μm.

Nano fabrication technologies may be crucial for construction of new nano devices and systems, as well as, for manufacturing of next generation, higher-density semiconductor devices. Conventional e-beam lithography, with single-line writing characteristics, is inherently slow and costly. Projection e-beam lithography technology, which is sometimes called as SCALPEL, may be able to handle approximately 1 $cm^2$ type exposure at a time with an exposure time of <1 second.

Figure 10:
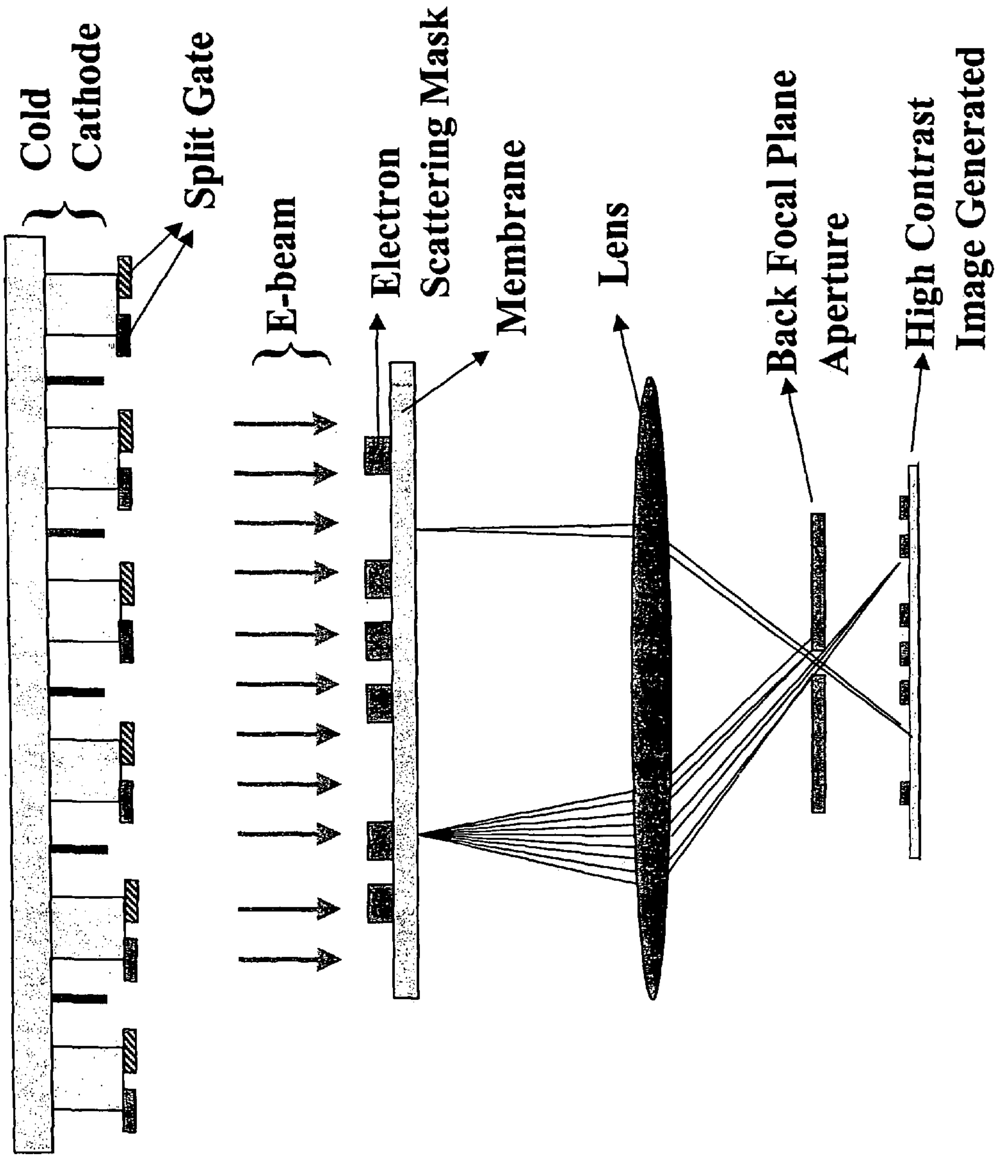
FIG. 10 illustrates an example projection e-beam lithography apparatus including a cold cathode with a split gate structural assembly in accordance with an example embodiment of the present invention.

In a projection electron-beam lithography tool according to an example embodiment of the present invention as illustrated in FIG. 10, a mask may include a lower atomic number membrane covered with a layer of a higher atomic number material, and contrast may be generated by utilizing the difference in electron scattering characteristics between the membrane material and the patterned mask material. The membrane may scatter electrons weakly and to small angles, while the patterned mask layer may scatter electrons strongly and to high angles. An aperture in the back focal plane of the projection optics may block the strongly scattered electrons, forming a high contrast image at the wafer plane to be e-beam patterned as illustrated in FIG. 10.

In example operation of the projection electron-beam lithography tool, the mask may be uniformly illuminated by a parallel beam of, e.g., 100 keV electrons generated by a cold cathode according to an example embodiment of the present invention further including open-ended nanotube array field emitters according to an example embodiment of the present invention. A reduction-projection optic, produces, for example, a 4:1 demagnified image of the mask at the wafer plane. Magnetic lenses can be used to focus the electrons. Projection e-beam lithography operations based on a 1:1 projection may also be applied.

X-ray radiation is widely used in medical and industrial applications. A conventional x-ray tube may include a metal filament (cathode), which emits electrons when resistively heated over 1000° C. and a metal target (anode) that emits x-rays when bombarded by the accelerated electrons. Traditional thermionic emission cathode, e.g., tungsten cathodes, may be coated with barium or barium oxide, or mixed with thorium oxide, and heated to a temperature around 1000C to produce a sufficient thermionic electron emission current on the order of amperes per square centimeter.

Heating thermionic cathodes to such high temperatures may cause a number of problems, namely, it may limit their lifetime, introduce warm-up delays and may require bulky auxiliary equipment. Limited lifetime is a consequence of the high operating temperature that causes constituents of the cathode, for example, barium or barium oxide, to evaporate from the hot surface. When the barium is depleted, the cathode (and hence the tube) can no longer function. Many thermionic vacuum tubes, for example, have operating lives of less than a year.

Another disadvantage may be the delay in emission from the thermionic cathodes due to the time required for temperature ramp-up. Delays up to 4 minutes have been experienced, even after the cathode reaches its desired temperature. This length of delay may be unacceptable in fast-warm-up applications, for example, some military sensing and commanding devices.

Another disadvantage may be that the high temperature operation may require a peripheral cooling system, for example, a fan, increasing the overall size of the device or the system in which it is deployed.

Another disadvantage may be that the high temperature environment near the grid electrode is such that the thermally induced geometrical/dimensional instability (e.g., due to the thermal expansion mismatch or structural sagging and resultant cathode-grid gap change) may not allow a convenient and direct modulation of signals by grid voltage alterations. One or more of these problems may be resolved or minimized if a more reliable cold cathode can be incorporated.

Recently, the demand has increased for compact and/or portable x-ray tubes that can be set up in a narrow space, e.g., between the fan blades of jet engines. Cathodes capable of such an application may include a field emitter array and a field-emissionbased x-ray tube, which can generate sufficient x-ray flux for diagnostics imaging applications, have been demonstrated.

Figure 11:
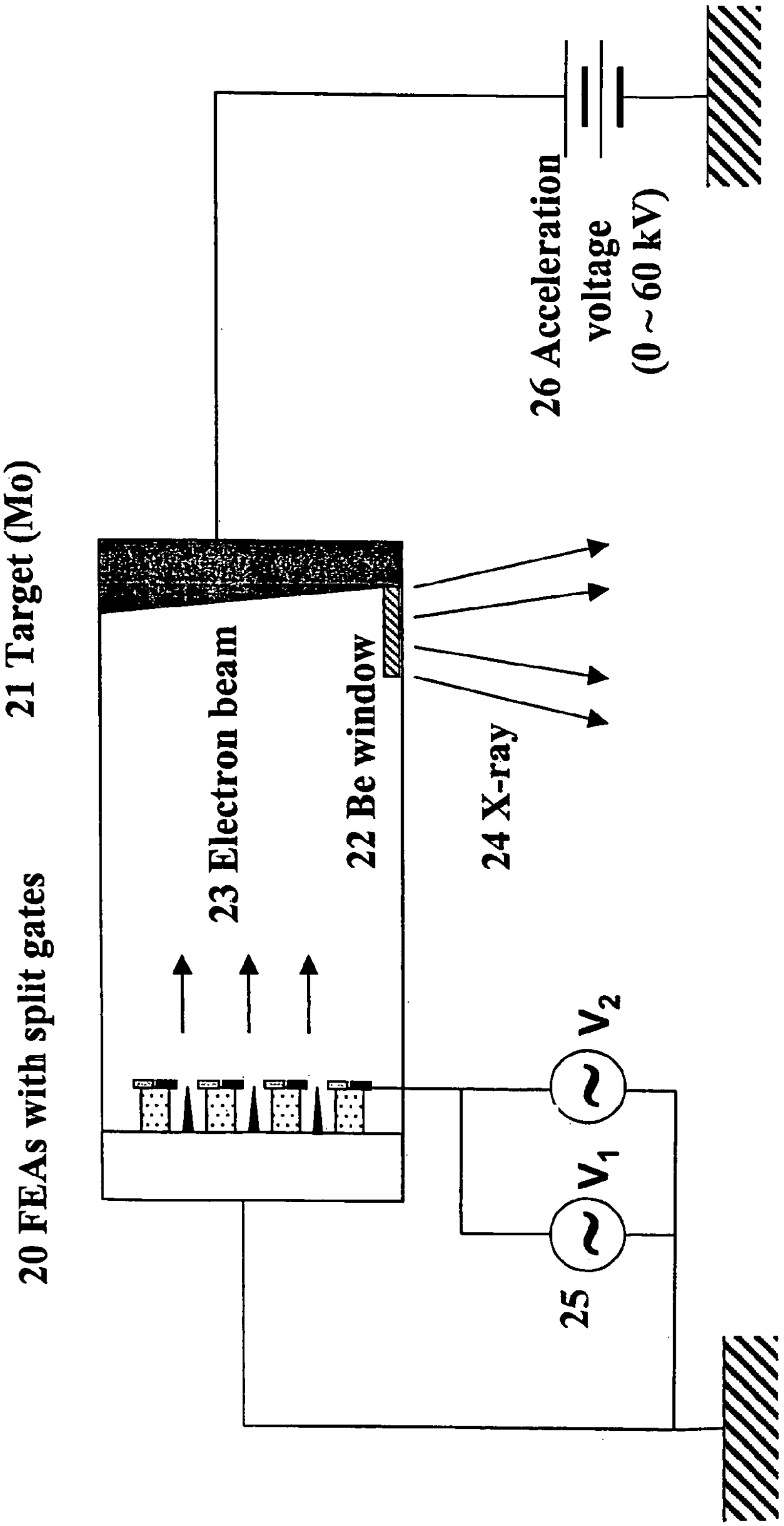
FIG. 11 illustrates an example x-ray source device with an improved uniformity beam profile, including a split gate structural assembly in accordance with an example embodiment of the present invention.

FIG. 11 illustrates an x-ray tube according to an example embodiment of the present invention, including a field emitter array with split gates 20 and a metal target 21 in a vacuum chamber with a window 22 (for example, Be). The field emitted electrons 23 may be accelerated by a high voltage source 26 between the target (anode, for example of Mo) 21 and the gate. The device of FIG. 11 can readily produce x-ray waveforms with programmable pulse width and repetition rate. Pulsed x-rays 24 with a repetition rate up to 30 kHz may be generated by applying an external triggering voltage 25 on the gate.

A field-emission-based x-ray tube may have one or more advantages compared to the thermionic x-ray tubes. For example, the life span of the x-ray tubes may be prolonged by eliminating the thermionic cathode. Further, the size of the x-ray source may be reduced and/or focused electron beams may produced with smaller energy spread and programmable pulse width and repetition rate, which enables portable and/or miniature x-ray sources for industrial and medical applications.

The use of a split-gate arrangement in a field-emission-based x-ray tube may improve the emission uniformity and resulting image resolution. The time-integrated uniformity of the resultant x-ray provided by a cathode structure according to an example embodiment of the present invention on any given location or selected area on the target substrate may be improved by at least 10% or by at least 30%, for example, as measured by the ratio of the highest cumulative x-ray dose on a given area of the anode or target surface to be exposed by x-ray, as compared to the lowest cumulative x-ray dose on the same given area.

It is understood that the above-described example embodiments are illustrative of only a few of the many possible embodiments, which can represent applications of the invention. Numerous and varied other arrangements can be made by those skilled in the art without departing from the spirit and scope of the invention.

What is claimed is:

1. A field emitter array, comprising:

split gates forming at least one gate hole for at least one emitter tip;

wherein an AC voltage $V_1$ is supplied to one of the split gates and an AC voltage $V_2$ is supplied to another of the split gates, and wherein an electron beam emitted from the at least one emitter tip is tilted or scanned by controlling a ratio of $V_1$ and $V_2$.

2. The field emitter array of claim 1, wherein the AC voltage $V_1$ and the AC voltage $V_2$ are DC offset square waves.

3. The field emitter array of claim 1, wherein the AC voltage $V_1$ and the AC voltage $V_2$ are DC offset sinusoidal waves.

4. The field emitter array of claim 1, wherein the split gates include a pair of electrodes for one-dimensional beam scanning.

5. A field emitter, comprising:

the field emitter array of claim 1;

an anode; and an anode voltage source, applying a voltage across the field emitter array and the anode.

6. The field emitter of claim 5, wherein a voltage $V_0$ is supplied by the anode voltage source, and wherein the electron beam emitted from the at least one emitter tip is tilted or scanned by controlling a ratio of $V_0$, $V_1$, and $V_2$.

7. A field emission display, comprising:

the field emitter array of claim 1, wherein the split gates act as a gate electrode; and an anode, including an anode substrate and a phosphor assembly;

wherein the electron beam impinging on the phosphor assembly to generate a display, and wherein a space between the anode and the field emitter array is under vacuum.

8. A projection electron-beam lithography tool, comprising:

a cathode, including the field emitter array of claim 1;

a scattering mask, including at least two membranes of different atomic number, for scattering the electron beam; and a focusing assembly for focusing the scattered electron beam to form an image.

9. An x-ray tube, comprising:

a vacuum chamber including a window;

the field emitter array of claim 1 within the vacuum chamber for emitting the electron beam; and an acceleration voltage source, supplying an acceleration voltage to the electron beam to output an x-ray beam through the window.

* * * * *